(12) United States Patent
Lee (10) Patent No.: US 7,675,877 B2
(45) Date of Patent: Mar. 9, 2010

(54) DIGITAL DEVICE CAPABLE OF COMMUNICATION AND BROADCAST RECEPTION AND METHOD FOR PROCESSING DIGITAL BROADCAST

(75) Inventor: Chul Soo Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 1085 days.

(21) Appl. No.: 11/298,709

(22) Filed: Dec. 12, 2005

(65) Prior Publication Data

US 2007/0091832 A1    Apr. 26, 2007

(30) Foreign Application Priority Data

Oct. 20, 2005    (KR) .............. 10-2005-0099400

(51) Int. Cl.
*H04B 7/00*    (2006.01)
(52) U.S. Cl. ............ 370/310; 455/412.2; 455/3.06; 455/557
(58) Field of Classification Search ........... 370/310; 455/412.2, 3.06, 557, 185.1
See application file for complete search history.

(56) References Cited

U.S. PATENT DOCUMENTS

| 6,480,591 | B1 * | 11/2002 | Penfield et al. ........ 379/144.01 |
| 6,868,264 | B2 * | 3/2005 | Dietz et al. ............... 455/403 |
| 7,016,665 | B2 * | 3/2006 | Tamaki et al. ............ 455/406 |
| 7,016,667 | B1 * | 3/2006 | Chapman et al. .......... 455/416 |
| 7,050,756 | B2 * | 5/2006 | Atkinson .................. 455/2.01 |
| 7,065,342 | B1 * | 6/2006 | Rolf ........................ 455/412.1 |
| 7,065,384 | B2 * | 6/2006 | Izadpanah ................ 455/562.1 |
| 7,139,566 | B2 * | 11/2006 | Ko et al. ................... 455/426.1 |
| 7,158,775 | B1 * | 1/2007 | Esaka ......................... 455/406 |
| 7,299,047 | B2 * | 11/2007 | Dolan et al. ................ 455/439 |
| 7,319,869 | B2 * | 1/2008 | Dietz et al. ............... 455/426.1 |
| 2003/0084460 | A1 * | 5/2003 | Chung et al. ............... 725/142 |
| 2003/0097659 | A1 | 5/2003 | Goldman |
| 2004/0204020 | A1 | 10/2004 | Kuramitsu |
| 2005/0085184 | A1 * | 4/2005 | Kaneda ..................... 455/3.04 |

FOREIGN PATENT DOCUMENTS

| JP | 2002-247490 A | 8/2002 |
| JP | 2005-223778 A | 8/2005 |
| KR | 10-2005-0059278 A | 6/2005 |
| KR | 10-2005-0073329 A | 7/2005 |
| WO | WO-02/03683 A1 | 1/2002 |

* cited by examiner

*Primary Examiner*—Joseph H Feild
*Assistant Examiner*—Huy D Nguyen
(74) *Attorney, Agent, or Firm*—Birch, Stewart, Kolasch & Birch, LLP

(57) ABSTRACT

An apparatus and a method for performing a time shift function according to a current call connection state are disclosed. If a user enters a call connection mode with another party while viewing digital broadcast signal, received digital broadcast signal is recorded. If the call connection mode is terminated, the digital broadcast signal stored from a start time of the call connection mode is reproduced and displayed. Therefore, although the user loses specific broadcast signal received during a call connection time, the user can continuously view the lost broadcast signal without any loss after the lapse of the call connection time.

20 Claims, 4 Drawing Sheets

DIGITAL DEVICE CAPABLE OF COMMUNICATION AND BROADCAST RECEPTION AND METHOD FOR PROCESSING DIGITAL BROADCAST

This application claims the benefit of Korean Patent Application No. 10-2005-0099400 filed on Oct. 20, 2005, which is hereby incorporated by reference as if fully set forth herein.

BACKGROUND OF THE INVENTION

1. Technical Field

The present invention relates to a digital device capable of communication and broadcast reception and a signal processing method therefor.

2. Discussion of the Related Art

With the increasing development of digital broadcast technology, a digital broadcast system based on the digital broadcast technology has been widely used in a variety of broadcast services, for example, a terrestrial broadcast service, a satellite broadcast service, and a cable broadcast service, etc., such that the broadcast industry as a whole has also rapidly changed.

In order to satisfy the changed broadcast environments, there has recently been proposed a new broadcast scheme for providing users with both a digital broadcast service and an improved broadcast service combined with a communication service, such that a mobile broadcast receiver for receiving broadcast signals is required to implement the above-mentioned new broadcast scheme.

A variety of mobile broadcast receivers are available for the aforementioned broadcast scheme, for example, a Digital Multimedia Broadcasting (DMB) terminal, a Digital Video Broadcasting-Handheld (DVB-H) terminal, and a Media Flow, etc. The above-mentioned mobile broadcast receiver is manufactured by applying a broadcast reception function to personal mobile terminals, for example, a hand-held phone, a Personal Digital Assistant (PDA), and a terminal mounted to a vehicle, such that it can provide users with a variety of multimedia broadcast services while in motion or at a fixed location.

SUMMARY OF THE INVENTION

Accordingly, the present invention is directed to a digital device capable of communication and broadcast reception and a digital broadcast processing method that substantially obviate one or more problems due to limitations and disadvantages of the related art.

An object of the present invention is to provide an apparatus and method for preventing digital broadcast signals from being lost during a call connection mode of a digital device capable of performing a communication function and a broadcast reception function.

Another object of the present invention is to provide an apparatus and method for storing digital broadcast signals during a call connection mode of a digital device capable of performing a communication function and a broadcast reception function, and reproducing the stored digital broadcast signals after the call connection mode is terminated.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for processing digital broadcast signal comprises the steps of: a) receiving digital broadcast signal, and displaying the received digital broadcast signal; b) if a call connection mode begins, storing the received digital broadcast signal; and c) if the call connection mode is terminated, reproducing the digital broadcast signal stored from a start time of the call connection mode.

In another aspect of the present invention, there is provided a method for processing digital broadcast signal comprising the steps of: a) receiving digital broadcast signal, and displaying the received digital broadcast signal; b) determining whether a time shift mode is established; c) if the time shift mode is established, starting a call connection mode, and at the same time storing digital broadcast signal received from a start time of the call connection mode; and d) if the call connection mode is terminated, reproducing the stored digital broadcast signal on the basis of a time shift mode setup time.

In still another aspect of the present invention, there is provided a method for processing digital broadcast signal comprising the steps of: a) receiving digital broadcast signal, and displaying the received digital broadcast signal; b) determining whether a time shift mode is established; c) if the time shift mode is established, beginning a call connection mode, and at the same time storing the received digital broadcast signal; d) if the call connection mode is terminated, selecting one of the stored digital broadcast signal and currently-received digital broadcast signal; and e) reproducing the stored digital broadcast signal or displaying the currently-received digital broadcast signal according to the selection result.

In still another aspect of the present invention, there is provided a method for processing digital broadcast signal comprising the steps of: a) receiving digital broadcast signal, and displaying the received digital broadcast signal; b) if a predetermined button (i.e., a time shift button) assigned for a time shift mode is pressed, starting a call connection mode, and at the same time storing the received digital broadcast signal; and c) if the call connection mode is terminated, reproducing the stored digital broadcast signal on the basis of a time shift button entry time.

In still another aspect of the present invention, there is provided a method for processing digital broadcast signal comprising the steps of: a) receiving digital broadcast signal, and displaying the received digital broadcast signal; b) determining whether a simultaneous viewing/recording mode for a time shift mode is established; c) if the simultaneous viewing/recording mode is established, starting a call connection mode, storing the received digital broadcast signal received from a start time of the call connection mode, and at the same time displaying the stored digital broadcast signal; d) if the call connection mode is terminated, selecting any one of the stored digital broadcast signal and currently-received digital broadcast signal; and e) reproducing the stored digital broadcast signal or displaying the currently-received digital broadcast signal according to the selection result.

In still another aspect of the present invention, there is provided a digital device capable of communication and broadcast reception comprising: a broadcast receiver for receiving digital broadcast signal; a storage unit for storing the digital broadcast signal received in the broadcast receiver; a transmission/reception unit for receiving or transmitting a communication signal; and a controller for detecting start and end times of a call connection mode, storing the digital broadcast signal received in the storage unit when the start time of the call connection mode is detected, and reproducing the digital broadcast signal stored in the storage unit from the start time of the call connection mode when the end time of the call connection mode is detected.

In still another aspect of the present invention, there is provided a digital device capable of communication and broadcast reception comprising: a broadcast receiver for receiving digital broadcast signal; a storage unit for storing the digital broadcast signal received in the broadcast receiver; a transmission/reception unit for receiving or transmitting a communication signal; and a controller for detecting start and end times of a call connection mode, determining whether a time shift mode is established if the call connection mode begins such that the received digital broadcast signal is stored in the storage unit, and reproducing the digital broadcast signal stored in the storage unit on the basis of a setup time of the time shift mode when the call connection mode is terminated.

In still another aspect of the present invention, there is provided a digital device capable of communication and broadcast reception comprising: a broadcast receiver for receiving digital broadcast signal; a storage unit for storing the digital broadcast signal received in the broadcast receiver; a transmission/reception unit for receiving or transmitting a communication signal; and a controller for detecting start and end times of a call connection mode, determining whether a simultaneous viewing/recording mode is established if the call connection mode begins such that the received digital broadcast signal is stored in the storage unit and at the same time is displayed, and outputting the digital broadcast signal stored in the storage unit or currently-received digital broadcast signal according to user setup condition information if the call connection mode is terminated.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Although a user who views broadcast signal of a broadcast program enters a call connection mode with a caller or called party during a predetermined time, a digital broadcast receiver according to the present invention enables the user to view specific broadcast signal received during the call connection mode after the lapse of the predetermined time, such that the user can view all broadcast signal of the broadcast program.

Specifically, provided that the user who views a broadcast program receives a phone call from a calling party or makes a phone call to a called party, and a call connection mode is established between the user or the caller or called party, the digital broadcast receiver according to the present invention records digital broadcast signal of the broadcast program during the call connection mode, and reproduces the recorded digital broadcast signal from a start time of the call connection mode after the call connection mode is terminated. For the convenience of description and better understanding of the present invention, the above-mentioned record/reproduction function is referred to as a time shift function.

The present invention can be more effectively used for a communication device capable of performing a communication function (also called a call connection function) and a broadcast reception function, for example, a fixed broadcast receiver and a mobile broadcast receiver.

Figure 1:
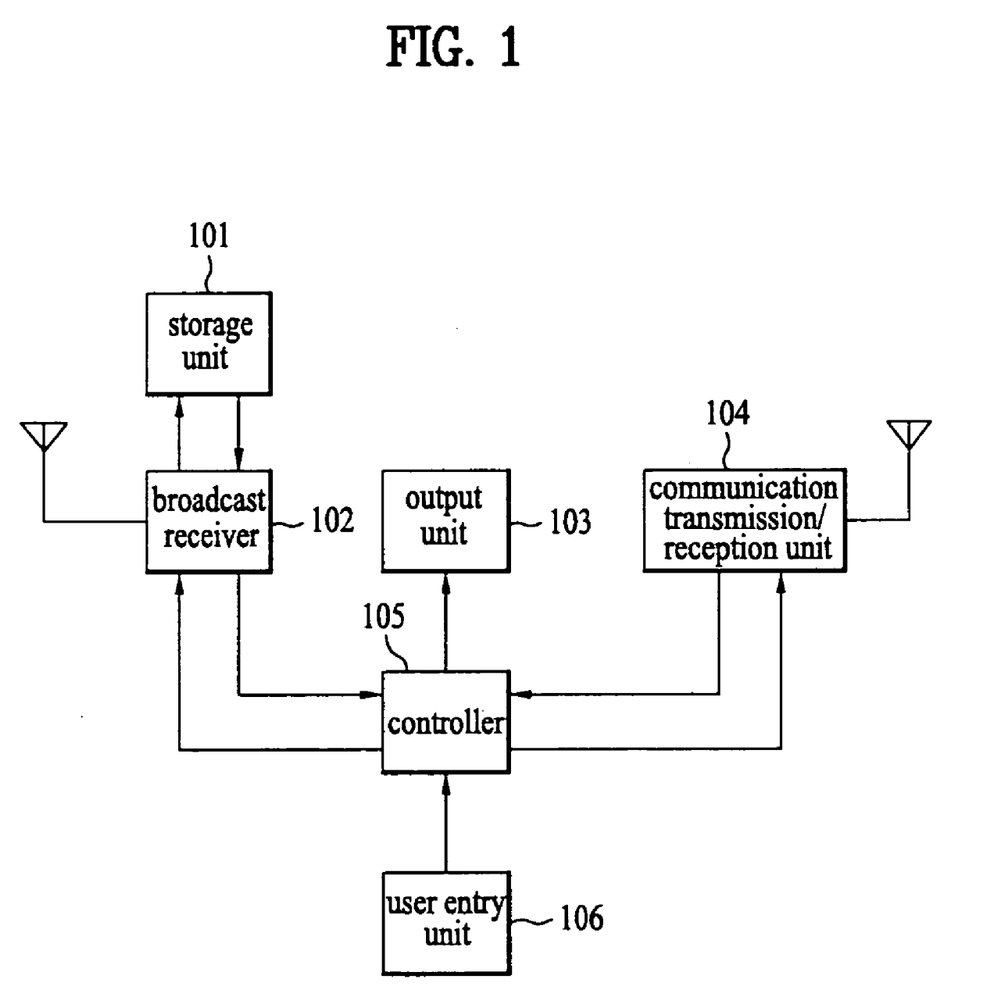
FIG. 1 is a block diagram illustrating a digital device capable of performing a communication function and a broadcast reception function according to the present invention.

FIG. 1 is a block diagram illustrating a mobile broadcast receiver capable of performing a communication function and a broadcast reception function according to the present invention.

Referring to FIG. 1, the mobile broadcast receiver includes a storage unit 101, a broadcast receiver 102, an output unit 103, a transmission/reception unit 104, a controller 105, and a user entry unit 106.

As shown in FIG. 1, the storage unit 101, the broadcast receiver 102, the output unit 103, the controller 105, and the user entry unit 106 are associated with a digital broadcast reception/record function. The transmission/reception unit 104, the output unit 103, the controller 105, and the user entry unit 106 are associated with a communication function.

The storage unit 101 may be indicative of an internal memory and/or a detachable external memory, for example, an SDRAM, a flash memory, a Hard Disc Drive (HDD), and an optical recording medium, etc. In this case, the storage unit 101 is available in various applications, such that it should be noted that the storage unit 101 may also be applicable to other examples other than the above-mentioned examples.

The user entry unit 106 may be indicative of either one of a keypad, a mouse, a remote-controller, and an earphone, etc. For the convenience of description, the present invention uses the keypad of a mobile broadcast terminal as a representative example of the user entry unit 106.

The broadcast receiver 102 receives a digital broadcast signal, demodulates the received digital broadcast signal, and decodes the demodulated broadcast signal. The broadcast receiver 102 includes a specific mode capable of switching on or off the time shift function, and is controlled by a control signal generated from the controller 105. In this case, the digital broadcast signal may be indicative of a dedicated audio broadcast signal or a composite broadcast signal in which audio and video signals are mixed. For the convenience of description, the present invention exemplarily uses the composite broadcast signal as the above-mentioned digital broadcast signal.

The transmission/reception unit 104 enables a user to establish a call connection state with another party connected to a communication network. The transmission/reception unit 104 transmits current transmission/reception state information to the controller 105. For example, the transmission/reception unit 104 transmits a variety of transmission/reception states to the controller 105, for example, information indicative of the occurrence of call-termination ringtones or call-origination ringtones, information indicative of a start time of an actual call connection state, and information indicative of an end time of the actual call connection state, etc.

The output unit 103 includes a display such as a Liquid Crystal Display (LCD), and a speaker, etc., such that a user views digital broadcast signal via the display, and listens to the digital broadcast signal via the speaker. In addition, the output unit 103 represents a call-origination state or a call-termination state via at least one of an image, a character, specific symbols, a lamp, vibration, and sound (i.e., ringtones).

If a user establishes a call connection state with a caller or called party while viewing digital broadcast signal, the controller 105 allows the digital broadcast signal to be stored in the storage unit 101 during a call connection time between the user and the caller or called party. If the call connection time between the user and the caller or called party elapses, the controller 105 reproduces the digital broadcast signal stored in the storage unit 101 from a start point of the call connection time.

In this case, the digital broadcast signal may not be transmitted to the output unit 103 as necessary, or may be transmitted to the output unit 103 simultaneously with being stored in the storage unit 103.

When outputting the stored digital broadcast signal to the output unit 103, video signal of the digital broadcast applied to the output unit 103 is displayed without any change whereas only audio signal of the digital broadcast is muted, or an audio mode is switched to a call connection mode. Otherwise, the audio signal is outputted via the output unit 103 without any change, or only the volume of the audio signal is reduced such that the audio signal of the reduced volume is outputted via the output unit 103. If the output unit 103 includes at least two speakers, one of the two speakers may output audio signal of the digital broadcast, and the other one may output audio signal associated with the call connection mode. If only one speaker is contained in the output unit 103, audio signal of the digital broadcast is combined with a communication sound, such that the combined result may be outputted via the output unit 103. In this case, the volume of the audio signal may be equal to that of the communication sound, and any one of the volumes of the audio signal and the communication sound is reduced so that the low-volume audio signal or the low-volume communication sound may be outputted via the output unit 103.

When outputting the stored digital broadcast signal to the output unit 103, audio signal of the digital broadcast is converted into caption data, and the caption data may be displayed on the output unit 103. In this case, the above-mentioned method for converting the audio signal into the caption data is more effectively used when a user transmits/receives a phone call to/from another party and an actual call connection mode is established between the user and another party. In this case, it should be noted that the use of the audio signal applied to the speaker is optional.

The above-mentioned methods for processing the audio signal of the digital broadcast are used as stated above, and the aforementioned methods are applicable in various ways, such that they are not limited to the above-mentioned examples, and are applicable to other examples as necessary.

In addition, when a call connection mode is established between a user and another party without storing the digital broadcast signal, the aforementioned digital broadcast signal may be outputted to the output unit 103, or may not be outputted to the outputted unit 103 as necessary. If the digital broadcast signal is outputted to the output unit 103, audio signal of the digital broadcast can be processed in the same manner as the method for simultaneously storing/displaying such digital broadcast signal. For example, the audio signal of the digital broadcast may be displayed in the form of caption data, or the volume of the audio signal is reduced or muted.

In the case where the digital broadcast signal is displayed during the call connection mode between the user and another party, this case is more effectively used for the user who communicates with another party via a speaker phone or an earphone. However, if the digital broadcast signal is displayed during the call connection mode, an amount of power consumption is increased, such that the aforementioned display of the digital broadcast signal during the call connection mode may be preset or pre-released by a user, or may be set or released by the user while the communication sound is generated or an actual call connection mode is established.

The time shift mode according to the present invention may be automatically established, or may be preset or pre-released by the user while the communication sound is generated or an actual call connection mode is established. The aforementioned establishing/releasing operations are performed by menus, buttons, voice data, caption data, and a touch-screen, etc.

For example, if there is no need to store digital broadcast signal for a predetermined period of time during which the digital broadcast signal is stored/displayed and a call connection mode is established between the user and another party, the user can immediately release the time shift mode using a specific menu or button, etc. If the time shift mode is released by the user, the digital broadcast signal is not stored in the storage unit 101 any more.

Otherwise, if it is necessary to store the digital broadcast signal on the condition that the digital broadcast signal is only displayed without being stored in the storage unit 101, the user can immediately set the time shift mode using a specific menu or button, etc. If the time shift mode is established by the user, the digital broadcast signal begins to be stored in the storage unit 101. If there is no need to display such digital broadcast signal, the user can immediately interrupt the display of the digital broadcast signal using a specific menu or button.

According to another preferred embodiment of the present invention, currently-received digital broadcast signal is not displayed in the form of moving images when the user communicates with another party simultaneously with storing the digital broadcast signal in the storage unit 101, and the last image displayed when the digital broadcast signal begins to be stored in the storage unit 101 may be displayed in the form of a still image.

In the meantime, if the call connection mode between the user and another party is terminated, the digital broadcast signal automatically stored in the storage unit 101 from the beginning point of the call connection mode may be outputted to the output unit 103. Otherwise, the user may determine whether to view either the digital broadcast signal stored in the storage unit 101 or currently-received digital broadcast signal using a specific menu or button. The above-mentioned user-determination may be pre-performed, or may be performed after the call connection mode is terminated.

If the time shift mode is established before an actual call connection mode begins, a reproduction start time of the digital broadcast signal stored in the storage unit 101 acts as a start time of the call connection mode. However, if the time shift mode is established during an actual call connection mode between the user and another party, an establishment time of the time shift mode acts as a reproduction start time. In other words, the reproduction start time of the digital broadcast signal stored in the storage unit 101 when the call connection mode elapses is changed according to the time shift mode establishment time.

When a call request is received or an actual call connection mode between a user and another party is established, the above-mentioned communication device according to the present invention allows the user to recognize whether the time shift mode is established, and enables the user to select/release the time shift mode. In other words, the setup or release of the time shift mode may be previously performed, or may also be performed when call-termination ringtones or call-origination ringtones are generated or when an actual call connection time is provided. The user can recognize whether the time shift mode is established using buttons, voice data, caption data, and a touch-screen, etc. In this way, the user can select or release the time shift mode using buttons, voice data, caption data, and a touch-screen, etc.

Operations of the time shift method for use in the above-mentioned communication device according to the present invention will hereinafter be described with reference to the annexed drawings.

First Preferred Embodiment

Figure 2:
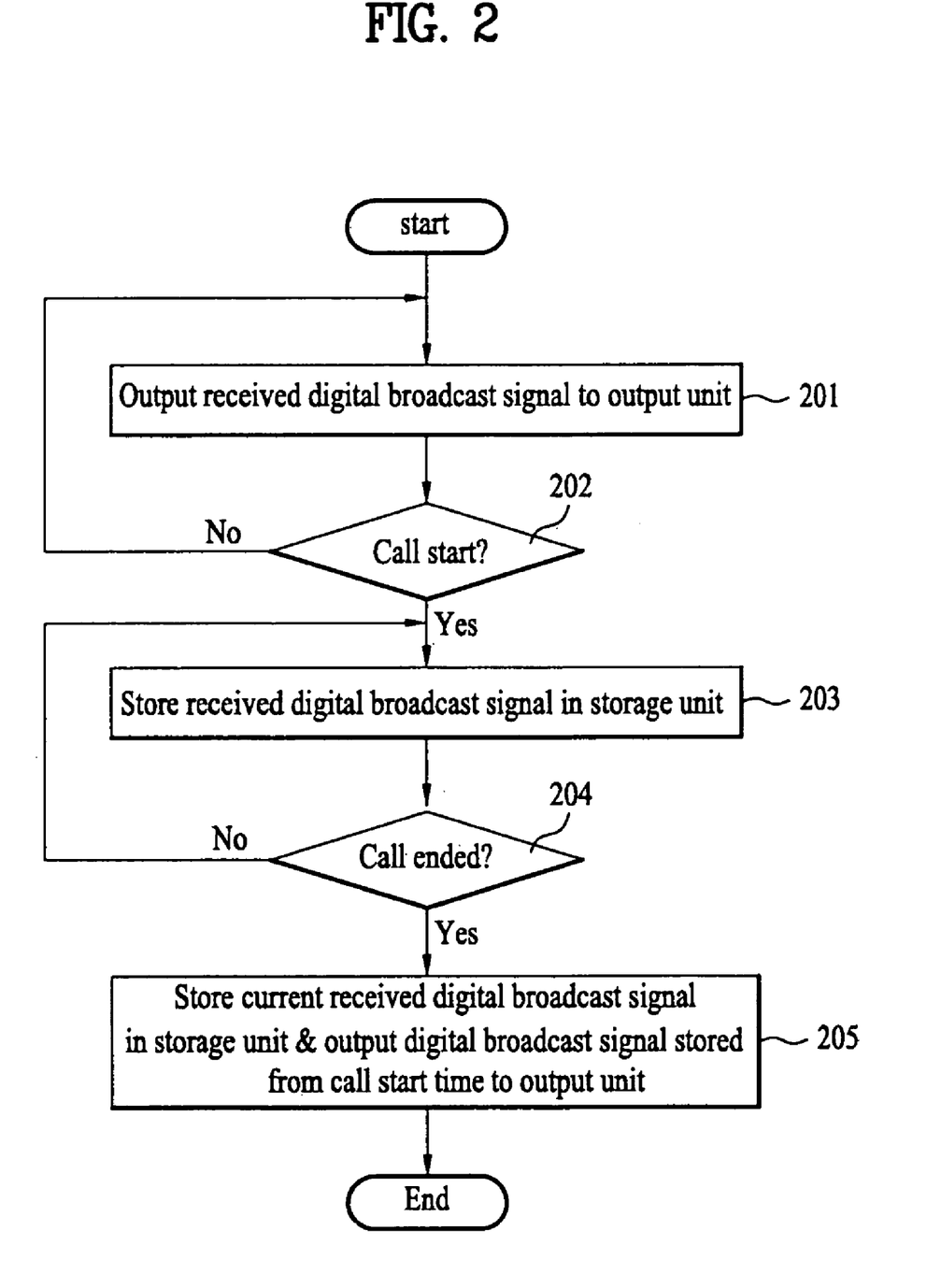
FIG. 2 is a flow chart illustrating a method for processing signals for use in a digital device capable of performing a communication function and a broadcast reception function in accordance with a first preferred embodiment of the present invention.

FIG. 2 is a flow chart illustrating a method for processing signals for use in a digital device in accordance with a first preferred embodiment of the present invention.

Referring to FIG. 2, a digital broadcast signal received via a tuner (not shown) is demodulated and decoded, such that the decoded digital broadcast signal is transmitted to an output unit at step 201. In this case, a video signal of the digital broadcast is visually displayed on the display contained in the output unit 103, and an audio signal of the digital broadcast is audibly outputted via the speaker contained in the output unit 103.

The controller 105 determines whether a call connection mode begins using a user entry unit 106 and/or the transmission/reception unit 104 while the digital broadcast signal is displayed at step 202.

The beginning of the call connection mode can be determined according to a variety of methods. For example, if a mobile broadcast receiver of a user receives an incoming call from another party, a specific time at which the user presses a "Call" button (also called a "Call" key) contained in the user entry unit 106 may be determined to be the beginning of the call connection mode. Otherwise, a specific time at which call-termination ringtones are reproduced may also be determined to be the beginning of the call connection mode. According to a first preferred embodiment of the present invention, if the mobile broadcast receiver of the user receives an incoming call from another party, a specific time at which the user presses the Call button is determined to be the beginning of the call connection mode, such that the mobile broadcast receiver of the user can record digital broadcast signal from the beginning point of an actual call connection mode.

On the contrary, if the user makes a phone call to another party, call-origination ringtones are generated when the user presses the Call button. In this case, the controller 105 determines a specific time at which the called party answers the phone call of the user to be the beginning of the call connection mode. The reason why the controller determines the call answering time of the called party to be the beginning of the call connection mode, and begins to record digital broadcast signal from the determined beginning point is not to perform the time shift function when the called party does not answer the phone call of the user.

While call-termination ringtones or call-origination ringtones are generated, video signal of the digital broadcast applied to the output unit is displayed without any change whereas only audio signal of the digital broadcast is muted, the volume of the audio signal is reduced, or an audio mode is switched to a call connection mode such that the call-termination ringtones or call-origination ringtones may be recognized by the user. In this case, the call connection mode may also be recognized by the user using vibration, a lamp, caption data, or specific symbols, etc.

The reason why the digital broadcast receiver according to the present invention determines an actual call start time to be the beginning of the call connection mode is to prevent the time shift function from being executed in some cases, for example, when a called party does not answer the phone call of the user, when the called party compulsorily terminates the phone call of the user, or when the user suddenly stops sending a phone call to another party after pressing the Call button.

In the meantime, if the beginning of the call connection mode is determined as described above, digital broadcast signal currently received by a control signal of the controller 105 is stored in the storage unit 101 at step 203, and at the same time current time information is stored in the storage unit 101.

In this case, the controller 105 may prevent the stored digital broadcast signal from being transmitted to the output unit 103, or may configure the last video signal displayed at a start time of the call connection mode in the form of a still image, such that the still image may be displayed after the call connection mode is terminated.

The stored digital video signal may be displayed in the form of moving images while the digital broadcast signal is stored in the storage unit 101. In this case, audio signal may be processed in various ways as described above, and the method for processing the audio signal will be described in a third preferred embodiment of the present invention at a later time.

Thereafter, if a termination state of the call connection mode is detected at step 204, the controller 105 reads the digital broadcast signal recorded in the storage unit 101 from the beginning point of the call connection mode, and outputs the read digital broadcast signal to the output unit 103 via the broadcast receiver 102 at step 205. In this case, the termination state of the call connection mode can be detected by a button signal generated from a specific button (e.g., an End button) pressed by the user.

In addition, the digital broadcast signal currently received in the digital broadcast receiver is successively recorded in the storage unit 101.

Thereafter, if the user cancels the time shift function, record/reproduction operations of the digital broadcast signal are interrupted by control signals of the controller 105, and currently-received digital broadcast signal is transmitted to the output unit 103.

The above-mentioned first preferred embodiment of the present invention shows an example in which the time shift mode is automatically performed during an actual call connection time between the user and another party.

Therefore, although the user who views digital broadcast signal enters a call connection mode with another party during a predetermined time, and therefore loses broadcast signal received during the predetermined time, the user can continuously view the lost broadcast signal without any loss after the lapse of the predetermined time.

Second Preferred Embodiment

Figure 3:
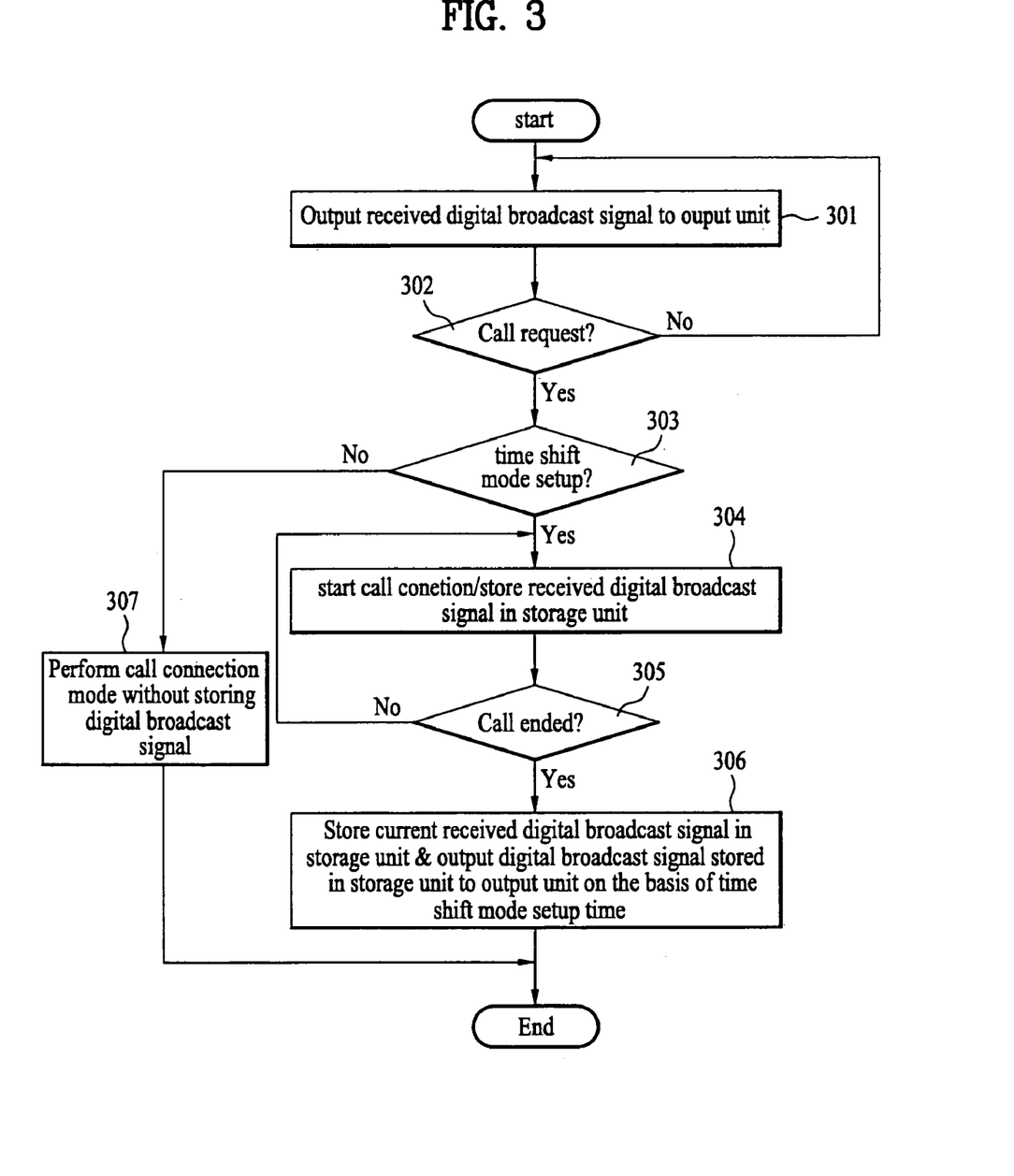
FIG. 3 is a flow chart illustrating a method for processing signals for use in a digital device capable of performing a communication function and a broadcast reception function in accordance with a second preferred embodiment of the present invention.

FIG. 3 is a flow chart illustrating a method for processing signals for use in a digital device in accordance with a second preferred embodiment of the present invention. In more detail, FIG. 3 shows an example in which the time shift mode can be freely established or released by a user, and also shows a flow chart illustrating operations associated with the aforementioned example.

Referring to FIG. 3, a digital broadcast signal received via a tuner is demodulated and decoded, such that the decoded digital broadcast signal is transmitted to an output unit at step 301. In this case, a video signal of the digital broadcast is displayed on the display contained in the output unit 103, and an audio signal of the digital broadcast is outputted via the speaker contained in the output unit 103.

The controller 105 determines the presence or absence of a call request signal using the transmission/reception unit 104 while the digital broadcast signal is displayed at step 302.

The presence or absence of the call request signal can be determined according to a variety of methods. According to the present invention, if a mobile broadcast receiver of a user receives an incoming call from another party, the presence of the call request signal is determined when call-termination ringtones are generated. If the user makes a phone call to another party, the presence of the call request signal is determined when the user presses a phone number of another party or call-origination ringtones are generated.

The above-mentioned call connection state can be recognized by the user via a display or speaker. The call connection state may also be recognized by the user using vibration, a lamp, caption data, or specific symbols, etc.

If the presence of the call request signal is determined at step 302, the controller 105 determines whether the time shift mode is established at step 303. If it is determined that the time shift mode is not established at step 303, the digital broadcast receiver allows a user to establish a call connection state with another party, and does not record digital broadcast signal at step 307. In this case, currently-received digital broadcast signal may be visually displayed on the output unit 103, or may not be displayed on the output unit 103. If the digital broadcast signal is displayed on the output unit 103, audio signal of the digital broadcast signal is converted into caption data, such that it is displayed in the form of caption data, the volume of the audio signal is reduced or muted, or an audio mode may be switched to a call connection mode. The user may previously establish or release the display of the digital broadcast signal. Otherwise, the user may establish or release the display of the digital broadcast signal when a call request signal is received or an actual call connection mode is provided.

If it is determined that the time shift mode is established at step 303, the controller 105 allows currently-received digital broadcast signal to be stored in the storage unit 101 at an actual call start time at step 304. In this case, current time information is also stored in the storage unit 101.

At the above step 304, the digital broadcast signal stored in the storage unit 101 may not be outputted to the output unit 103. Otherwise, the digital broadcast signal may be stored in the storage unit 101, and at the same time the last image received at a start time of a call connection mode is outputted to the output unit 103, such that the last image may be displayed in the form of a still image until the call connection mode is terminated.

In addition, at the above step 304, the stored digital broadcast signal may be outputted to the output unit 103, such that it may be displayed in the form of moving images. In this case, audio signal of the digital broadcast may be processed in various ways, and the method for processing the audio signal will be described in a third preferred embodiment of the present invention at a later time.

When a call request signal is received or an actual call connection mode between a user and another party is established, the above-mentioned communication device according to the present invention allows the user to recognize whether the time shift mode is established, and enables the user to select/release the time shift mode. In other words, the setup or release of the time shift mode may be previously performed, or may also be performed when call-termination ringtones or call-origination ringtones are generated or when an actual call connection time is provided. The user can recognize whether the time shift mode is established using buttons, voice data, caption data, and a touch-screen, etc. In this way, the user can select or release the time shift mode using buttons, voice data, caption data, and a touch-screen, etc.

For example, the output unit 103 displays a specific image for allowing the user to click on YES or NO button indicative of the activation or inactivation of the time shift function. In this case, the output unit 103 may display the specific image according to an On Screen Demand (OSD) method.

In this case, if the user clicks on the YES button for the activation of the time shift mode, or does not click on any one of the YES button and the NO button, it is determined that the time shift mode is activated, such that the controller 105 allows currently-received digital broadcast signal to be stored in the storage unit 101 at an actual call start time.

In the meantime, if the user clicks on the NO button for the inactivation of the time shift mode, the digital broadcast signal is not recorded in the storage unit 101 during a call connection time between the user and another party. In this case, currently-received digital broadcast signal may be visually displayed on the output unit 103, or may not be displayed on the output unit 103 as necessary.

Provided that the time shift function is pre-established in the communication device of the user, and at the same time the communication device of the user receives a phone call from another party, the digital broadcast signal begins to be stored in the storage unit 101 when the user presses the Call button. Provided that the user makes a phone call to a called party, the digital broadcast signal begins to be stored in the storage unit 101 when the called party answers the phone call.

If the time shift mode is pre-established or established while a communication sound such as call-termination ringtones or call-origination ringtones is generated, a call connection mode between the user and another party begins, and at the same time digital broadcast signal is stored. If the call connection mode is terminated, a reproduction start time of the digital broadcast signal is set to the start time of the call connection mode. However, if the time shift mode is established at a specific time contained in an actual call connection mode between the user and another party, the digital broadcast signal begins to be stored in the storage unit from the specific time. If the call connection mode is terminated, a reproduction start time of the digital broadcast signal is set to the time shift mode setup time.

The present invention may employ a specific button or key (i.e., a time shift button) for the time shift mode to establish/release the time shift mode. In other words, the user presses the time shift button when a communication sound is pre-generated or generated or an actual call connection time is provided, such that the user can establish the time shift mode. In this case, the setup/release operations of the time shift mode can be performed by different buttons, and the aforementioned time shift button may be toggled. In other words, if the time shift button is pressed once, the time shift mode is established. And, if the user again presses the time shift button, the time shift mode is released.

The present invention may use the time shift button using another method different from the aforementioned method. For example, if the user presses the Call button when receiving the phone call from another party, the user can communicate with another party without storing digital broadcast signal in the storage unit 101. Thereafter, if the user presses the time shift button or key, the activation of the time shift function is determined, such that the communication device establishes a call connection mode between the user and another party, and at the same time stores the digital broadcast signal in the storage unit 101. In addition, if the user presses a phone number of the called party, and then presses the Call button, the communication device allows the user to establish the call connection state with the called party without storing the digital broadcast signal in the storage unit 101. If the user presses the time shift button or key, the digital broadcast signal is stored in the storage unit 101 when the called party who listens to the call-origination ringtones answers the phone call of the user.

If the user presses the time shift button or key in other situations other than the call connection situation, for example, a specific situation in which the user cannot view broadcast signal because the user has a conversation with others, a general time shift function is executed.

If a termination state of the call connection mode is detected when the digital broadcast signal is recorded in the storage unit 101 at step 305, the controller 105 reads the digital broadcast signal recorded in the storage unit 101, and outputs the read digital broadcast signal to the output unit 103 via the broadcast receiver 102 at step 306. In this case, the termination state of the call connection mode can be detected by a button signal generated from a specific button (e.g., an End button) entered by the user.

In this case, a reproduction start time of the stored digital broadcast signal is changed according to the setup time of the time shift mode. For example, if the time shift mode is pre-established, or is established while a communication sound is generated, the reproduction start time of the digital broadcast signal is equal to the beginning point of the call connection mode. If the time shift mode is established during an actual call connection mode, the reproduction start time is equal to the time shift mode setup time.

In the meantime, if the call connection mode is terminated, the digital broadcast signal stored in the storage unit 101 is automatically reproduced, such that the reproduced digital broadcast signal may be outputted to the output unit 103. The user can select whether to view either the digital broadcast signal stored in the storage unit 101 or currently-received digital broadcast signal using a specific menu or button. The above-mentioned user selection may be pre-executed, or may also be performed after the call connection mode is terminated.

If the reproduction of the stored digital broadcast signal is selected, currently-received digital broadcast signal is continuously recorded in the storage unit 101. Therefore, if the user does not enter an additional command, the user views the digital broadcast signal stored in the storage unit 101.

However, if the user selects to view the currently-received broadcast signal, or selects to release the time shift mode while the stored digital broadcast signal is reproduced, the record/reproduction operations of the digital broadcast signal are interrupted by the controller 105, and the currently-received digital broadcast signal is outputted to the output unit 103.

Provided that the user does not answer a call request signal of another party under the call request state of the above step 302, compulsorily terminates the call request signal under the call request state of the above step 302, or suddenly stops sending a call request signal to another party, currently-received digital broadcast signal is directly transmitted to the output unit 103 without being stored in the storage unit 101.

As a result, the user can selectively use the time shift function. Although the user who views digital broadcast signal enters a call connection mode with another party during a predetermined time, and therefore loses broadcast signal received during the predetermined time, the user can continuously view the lost broadcast signal without any loss after the lapse of the predetermined time.

Third Preferred Embodiment

Figure 4:
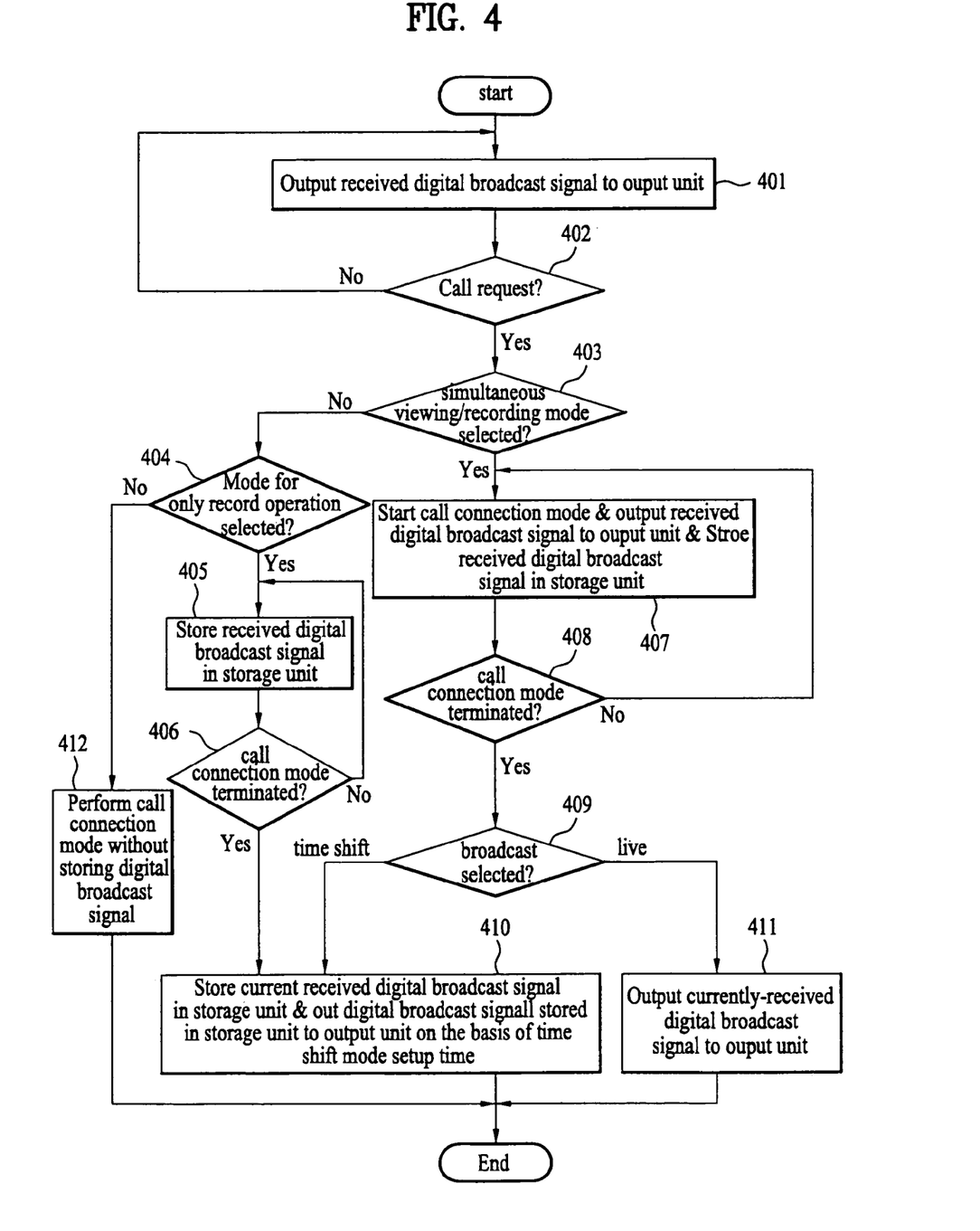
FIG. 4 is a flow chart illustrating a method for processing signals for use in a digital device capable of performing a communication function and a broadcast reception function in accordance with a third preferred embodiment of the present invention.

FIG. 4 is a flow chart illustrating a method for processing signals for use in a digital device in accordance with a third preferred embodiment of the present invention.

According to the third preferred embodiment of the present invention, the user can selectively use the time shift function during a call connection time, digital broadcast signal received during the call connection time is stored in the storage unit 101, and at the same time the output unit 103 outputs the digital broadcast signal.

The third preferred embodiment of the present invention classifies the aforementioned time shift mode into two time shift modes (i.e., first and second time shift modes). The first time shift mode displays the digital broadcast signal simultaneously with storing the digital broadcast signal in the storage unit 101, and at the same time enables a user to communicate with another party. The second time shift mode only stores the digital broadcast signal in the storage unit, and at the same time enables the user to communicate with another party. For the convenience of description, the first time shift mode is referred to as a simultaneous viewing/recording mode. The second time shift mode may not output the digital broadcast signal to the output unit 103, or may visually output video signal of the digital broadcast signal in the form of still images.

The aforementioned simultaneous viewing/recording mode may mute audio signal of the digital broadcast applied to the output unit 103, or may switch an audio mode to a call connection mode. Otherwise, the simultaneous viewing/recording mode output the audio signal via the output unit 103 without any change, or reduces only the volume of the audio signal such that the audio signal of the reduced volume is outputted via the output unit 103. According to the simultaneous viewing/recording mode, if the output unit 103 includes at least two speakers, one of the two speakers may output audio signal of the digital broadcast, and the other one may output audio signal associated with the call connection mode. If only one speaker is contained in the output unit 103, audio signal of the digital broadcast is combined with a communication sound, such that the combined sound may be outputted via the output unit 103. In this case, the volume of the audio signal may be equal to that of the communication sound, and any one of the volumes of the audio signal and the communication sound is reduced so that the low-volume audio signal or the low-volume communication sound may be outputted via the output unit 103.

When outputting the stored digital broadcast signal to the output unit 103, audio signal of the digital broadcast is converted into caption data, and the caption data may be displayed on the output unit 103. In this case, the above-mentioned method for converting the audio signal into the caption data is more effectively used when a user transmits/receives a phone call to/from another party and an actual call connection mode is established between the user and another party. In this case, it should be noted that the use of the audio signal applied to the speaker is optional.

The aforementioned third preferred embodiment can be more effectively used for the user who communicates with another party via a speaker phone or an earphone.

Steps 401~402 of FIG. 4 according to the third preferred embodiment are equal to steps 301~302 of FIG. 3 according to the second preferred embodiment, such that a detailed description thereof will herein be omitted for the convenience of description.

If the presence of the call request signal is determined at step 402, the controller 105 determines whether the time shift mode is set to the simultaneous viewing/recording mode at step 403.

If it is determined that the simultaneous viewing/recording mode is not established at step 403, the communication device determines whether the second time shift mode capable of only storing the digital broadcast signal in the storage unit 101 at step 404. In this case, if the second time shift mode is not established at step 404, the user can immediately communicate with another party at step 412. In this case, the display of the digital broadcast signal is optional. The currently-received digital broadcast signal may be visually displayed on the output unit 103, or may not be displayed on the output unit 103. If the digital broadcast signal is displayed on the output unit 103, audio signal of the digital broadcast is converted into caption data, such that it is displayed in the form of caption data, the volume of the audio signal is reduced or muted, or an audio mode may be switched to a call connection mode. The user may previously establish or release the display of the digital broadcast signal. Otherwise, the user may establish or release the display of the digital broadcast signal when a call request signal is received or an actual call connection mode is provided.

If it is determined that the second time shift mode is established at step 404, the controller 105 allows currently-received digital broadcast signal to be stored in the storage unit 101 at an actual call start time at step 405.

At the above step 405, the digital broadcast signal stored in the storage unit 101 may not be outputted to the output unit 103, or the last image received at a start time of a call connection mode is displayed on the output unit 103 in the form of a still image until the call connection mode is terminated.

If the simultaneous viewing/recording mode is established at step 403, the call connection time between the user and another party begins, and at the same time the digital broadcast signal is stored in the storage unit 101 simultaneously with being applied to the output unit 103 at step 407. In this case, the audio signal of the digital broadcast signal applied to the output unit 103 is processed by any one of the aforementioned first and second time shift modes.

The setup or release of the first time shift mode (i.e., the simultaneous viewing/recording mode) or the second time shift mode may be previously performed, or may also be performed when call-termination ringtones or call-origination ringtones are generated or when an actual call connection time is provided. The aforementioned setup/release operation of the first and second time shift modes are performed by menus, buttons, voice data, caption data, and a touch-screen, etc.

For example, if there is no need to store the displayed digital broadcast signal while the digital broadcast signal is displayed and at the same time the user actually communicates with another party, the user can immediately release the time shift mode using a specific menu or button, such that the digital broadcast signal is not stored in the storage unit 101 from the release time of the time shift mode. In this case, the display of the digital broadcast signal may be automatically released, may be maintained by a user request, or may also be released by another user request.

On the contrary, if there is need to store the digital broadcast signal on the condition that the digital broadcast signal is only displayed without being stored in the storage unit 101, the user can immediately establish the time shift mode using a specific menu or button, such that the digital broadcast signal is stored in the storage unit 101. If there is no need to display the digital broadcast signal, the user can immediately stop the display of the digital broadcast signal using a specific button or menu.

If a termination state of the call connection mode is detected while the digital broadcast signal is stored in the storage unit 101 according to the aforementioned processes at step 406 or 408, the controller 105 reads the digital broadcast signal recorded in the storage unit 101 from the beginning point of the call connection mode, and outputs the read digital broadcast signal to the output unit 103 via the broadcast receiver 102 at step 410. In this case, the termination state of the call connection mode can be detected by a button signal generated from a specific button (e.g., an End button) pressed by the user.

For another example, if a termination state of the call connection mode is detected while the digital broadcast signal is stored in the storage unit 101 at step 406 or 408, the user can select whether to view digital broadcast signal stored in the storage unit 101 (i.e., a time shift mode) or to view current broadcast signal (i.e., a live mode) using a specific menu image or a specific button at step 409.

If the user selects the time shift mode at step 409, the controller 105 reads the digital broadcast signal recorded in the storage unit 101 from the beginning point of the call connection mode, and outputs the read digital broadcast signal to the output unit 103 via the broadcast receiver 102 at step 410. In addition, currently-received digital broadcast signal is successively recorded in the storage unit 101. Therefore, if the user does not enter an additional command using the user entry unit 106, the user can view the digital broadcast signal recorded in the storage unit 101. Thereafter, if the user cancels or releases the time shift mode, record/reproduction operations of the digital broadcast signal are interrupted by control signals of the controller 105, and the currently-received digital broadcast signal is transmitted to the output unit 103.

In the meantime, if the user selects the live mode at step 409, the controller 105 transmits currently-received digital broadcast signal to the output unit 103 via the broadcast receiver 102 at step 411, such that it allows the user to view only video signal of digital broadcast signal without listening to audio signal of the digital broadcast during the call connection mode. In this case, if the call connection mode is terminated, the user may desire to re-view previous broadcast signal received during the call connection mode, simultaneously with listening to the audio signal. Otherwise, the user has viewed the video signal of the digital broadcast during the call connection mode, such that the user may desire to view currently-received digital broadcast signal in real time.

As a result, the user may selectively use the time shift mode, or may view digital broadcast signal, simultaneously with performing the time shift mode. Also, although the user who views digital broadcast signal enters a call connection mode with another party during a predetermined time, and therefore loses broadcast signal received during the predetermined time, the user can continuously view the lost broadcast signal without any loss after the lapse of the predetermined time.

In the meantime, provided that the user does not intentionally answer a call request signal of another party under the call request state of the above step 402, compulsorily terminates the call request signal under the call request state of the above step 402, or suddenly stops sending a call request signal to another party, currently-received digital broadcast signal is directly transmitted to the output unit 103 without being stored in the storage unit 101.

According to the third preferred embodiment of the present invention, a reproduction start time of the stored digital broadcast signal is changed according to the setup time of the time shift mode. For example, if the time shift mode (e.g., the simultaneous viewing/recording mode or the second time shift mode) is pre-established, or is established while a communication sound is generated, the reproduction start time of the digital broadcast signal is equal to the beginning point of the call connection mode. If the time shift mode is established during an actual call connection mode, the reproduction start time is equal to the time shift mode setup time.

As apparent from the above description, a communication device and a method for processing signals for use in the same according to the present invention store digital broadcast signal received during a call connection mode, and reproduce the stored digital broadcast signal when the call connection mode is terminated. Therefore, although a user who views digital broadcast signal enters a call connection mode with another party during a predetermined time, and therefore loses broadcast signal received during the predetermined time, the user can continuously view the lost broadcast signal without any loss after the lapse of the predetermined time.

The present invention allows the user to select a time shift function, resulting in increased memory efficiency.

In addition, the present invention records digital broadcast signal received during a call connection mode, and at the same time outputs the digital broadcast signal to the output unit, such that the user can conveniently communicate with another party via a speaker phone or an earphone.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for processing a digital broadcast signal via a digital device, the method comprising:
   receiving a digital broadcast signal;
   storing the received digital broadcast signal in a memory of the digital device;
   receiving or transmitting a communication signal;
   detecting start and end times of a call connection mode;
   determining whether a time shift mode is established if the call connection mode begins such that the received digital broadcast signal is stored in the memory; and
   reproducing the digital broadcast signal stored in the memory on the basis of a setup time of the time shift mode when the call connection mode is terminated, wherein the storing step further includes, if a predetermined button assigned for the time shift mode is pressed when sending a call request signal to a called party, storing a digital broadcast signal received from a specific time at which the called party answers the call request signal.

2. The method according to claim 1, wherein the received digital broadcast signal is not displayed if the call connection mode begins.

3. The method according to claim 1, further comprising:
   displaying a video signal of the digital broadcast received at the start time of the call connection mode in the form of a still image.

4. The method according to claim 1, further comprising:
   displaying a video signal of the digital broadcast if the call connection mode begins; and
   reproducing the stored digital broadcast signal or displaying a currently-received digital broadcast signal according to user setup condition information if the call connection mode is terminated.

5. The method according to claim 1, further comprising:
   if the time shift mode is pre-established or is established when a communication sound is generated, starting the call connection mode simultaneously with storing the received digital broadcast signal; and
   determining a reproduction start time of the stored digital broadcast signal to be a start time of the call connection mode if the call connection mode is terminated.

6. The method according to claim 1, further comprising:
   if the time shift mode is established during the call connection mode, storing the digital broadcast signal received from a setup time of the time shift mode; and
   determining a reproduction start time of the stored digital broadcast signal to be a setup time of the time shift mode.

7. The method according to claim 1, further comprising:
   if a predetermined button assigned for the time shift mode is pressed by a user when the user receives a call request signal from a caller party, starting the call connection mode, and at the same time storing the received digital broadcast signal; and
   if a "Call" button is pressed by the user, performing only the call connection mode without storing the received digital broadcast signal.

8. The method according to claim 1, further comprising:
   if the time shift mode is released, providing a specific situation in which the time shift mode can be established, and controlling a record operation of the received digital broadcast signal according to mode setup condition information.

9. The method according to claim 1, further comprising
   if the time shift mode is released, displaying the received digital broadcast signal or not displaying the received digital broadcast signal according to display setup condition information.

10. A digital device capable of communication and broadcast reception, comprising,
    a broadcast receiver configured to receive a digital broadcast signal;
    a storage unit configured to store the digital broadcast signal received in the broadcast receiver;

a transmission/reception unit configured to receive or transmit a communication signal; and a controller configured to detect start and end times of a call connection mode, store the digital broadcast signal received in the storage unit, and display a video signal of the digital broadcast signal when the start time of the call connection mode is detected, and reproduce the stored digital broadcast signal or display currently-received digital broadcast signal according to user setup condition information when the end time of the call connection mode is detected, wherein the controller, if a predetermined button assigned for the time shift mode is pressed when sending a call request signal to a called party, stores a digital broadcast signal received from a specific time at which the called party answers the call request signal.

11. A digital device capable of communication and broadcast reception, comprising:

a broadcast receiver configured to receive a digital broadcast signal;

a storage unit configured to store the received digital broadcast signal;

a transmission/reception unit configured to receive or transmit a communication signal; and a controller configured to detect start and end times of a call connection mode, determine whether a time shift mode is established if the call connection mode begins such that the received digital broadcast signal is stored in the storage unit, and reproduce the digital broadcast signal stored in the storage unit on the basis of a setup time of the time shift mode when the call connection mode is terminated, wherein the controller, if a predetermined button assigned for the time shift mode is pressed when sending a call request signal to a called party, stores a digital broadcast signal received from a specific time at which the called party answers the call request signal.

12. The digital device capable of communication and broadcast reception according to claim 11, wherein the received digital broadcast signal is not displayed if the call connection mode begins.

13. The digital device capable of communication and broadcast reception according to claim 11, wherein the controller displays a video signal of the digital broadcast received at the start time of the call connection mode in the form of a still image.

14. The digital device capable of communication and broadcast reception according to claim 11, wherein the controller displays a video signal of the digital broadcast if the call connection mode begins, and reproduces the stored digital broadcast signal or displays a currently-received digital broadcast signal according to user setup condition information if the call connection mode is terminated.

15. The digital device capable of communication and broadcast reception according to claim 11, wherein the controller, if the time shift mode is pre-established or is established when a communication sound is generated, starts the call connection mode simultaneously with storing the received digital broadcast signal, and determines a reproduction start time of the stored digital broadcast signal to be a start time of the call connection mode if the call connection mode is terminated.

16. The digital device capable of communication and broadcast reception according to claim 11, wherein the controller, if the time shift mode is established during the call connection mode, stores the digital broadcast signal received from a setup time of the time shift mode, and determines a reproduction start time of the stored digital broadcast signal to be a setup time of the time shift mode.

17. The digital device capable of communication and broadcast reception according to claim 11, wherein the controller, if a predetermined button assigned for the time shift mode is pressed by a user when the user receives a call request signal from a caller party, starts the call connection mode, and at the same time stores the received digital broadcast signal, and if a "Call" button is pressed by the user, performs only the call connection mode without storing the received digital broadcast signal.

18. The digital device capable of communication and broadcast reception according to claim 11, wherein the controller, if the time shift mode is released, provides a specific situation in which the time shift mode can be established, and controls a record operation of the received digital broadcast signal according to mode setup condition information.

19. The digital device capable of communication and broadcast reception according to claim 11, wherein the controller, if the time shift mode is released, displays the received digital broadcast signal or does not display the received digital broadcast signal according to display setup condition information.

20. A digital device capable of communication and broadcast reception, comprising:

a broadcast receiver configured to receive a digital broadcast signal;

a storage unit configured to store the digital broadcast signal received in the broadcast receiver;

a transmission/reception unit configured to receive or transmit a communication signal; and a controller configured to detect start and end times of a call connection mode, determine whether a simultaneous viewing/recording mode is established if the call connection mode begins such that the received digital broadcast signal is stored in the storage unit and at the same time is displayed, and output the digital broadcast signal stored in the storage unit or currently-received digital broadcast signal according to user setup condition information if the call connection mode is terminated, wherein the controller, if a predetermined button assigned for the time shift mode is pressed when sending a call request signal to a called party, stores a digital broadcast signal received from a specific time at which the called party answers the call request signal.

* * * * *